Jan. 21, 1941.   A. KEEFE   2,229,379
VALVE STEM
Original Filed Nov. 13, 1931
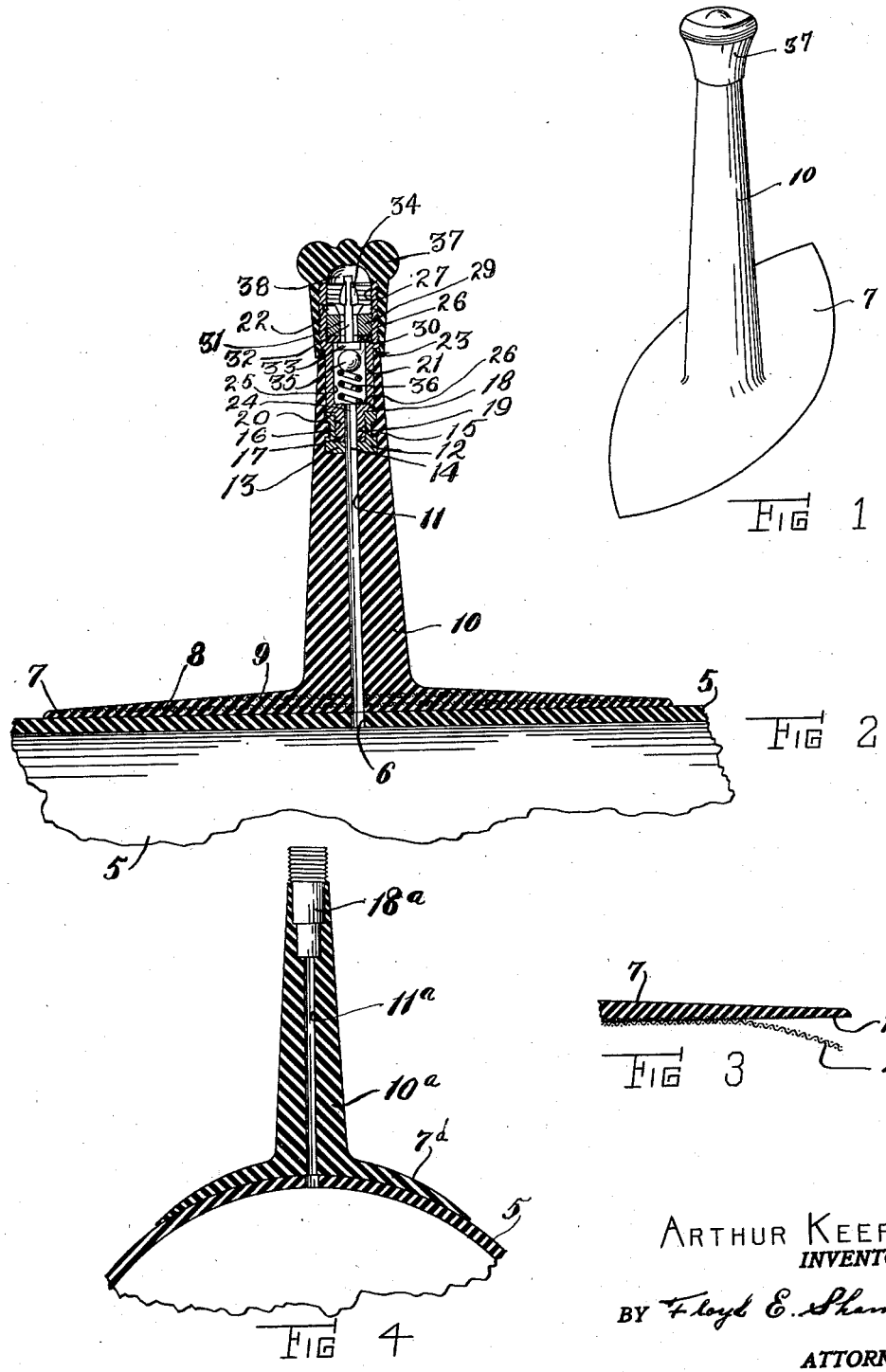
ARTHUR KEEFE
INVENTOR
BY Floyd E. Shannon
ATTORNEY Patented Jan. 21, 1941

2,229,379

UNITED STATES PATENT OFFICE 2,229,379

VALVE STEM

Arthur Keefe, Akron, Ohio, assignor to The F. H. Watson Company, Jonesboro, Ark., a corporation of Delaware Application November 13, 1931, Serial No. 574,683
Renewed October 26, 1938

6 Claims. (Cl. 137—69.1)

This invention relates to inner tubes for pneumatic tires and has particular reference to improvements in valve stems for such tubes.

Objects of the invention are to provide a flexible valve stem which can be manufactured at a low cost, which will be strong and durable and which can be quickly and conveniently secured to the tube.

Other objects are to provide an inflatable tube having a flexible rubber valve stem provided with a flat base adapted to be cemented or vulcanized to the outer surface of the tube and to provide means for reinforcing said base whereby the usual reinforced valve patch may be omitted and to thereby provide a more efficient tube which can be more economically manufactured.

Additional objects are to provide a relatively soft, flexible valve stem which may be used on the inner tube of a pneumatic tire and which may be drawn into the casing in case the tube creeps into the tire or on the rim and the tube may be continued in operation without injury to the valve stem or tube.

A further object is to provide a rubber valve stem having valve parts detachably secured in the outer end portion thereof and to provide a new and improved valve core which when used in combination with the above described stem will be very efficient and reliable.

A further object is to provide a rubber valve stem having a bore extending axially therethrough and having an anchoring member vulcanized therein at a point in spaced relation to the outer end thereof and to provide said anchoring member with a seat whereby a valve container may be threaded therein and securely held in an operative position in the end of said valve stem.

The above and other objects and advantages are attained by the novel construction hereinafter described and illustrated in the accompanying drawing wherein there is shown an illustrated embodiment of the invention, it being understood that the invention is not confined to the particular adaptation illustrated and described and that changes and modifications may be made which come within the scope of the claims hereunto appended.

In the drawing:—

Figure 1 is a perspective view of a valve stem constructed in accordance with this invention, Figure 2 is a central, longitudinal view showing the same operatively attached to an inner tube, a portion of the inner tube being shown in section with parts broken away to conserve space, Figure 3 is a fragmentary, sectional view showing a portion of the base or attaching flap of said valve stem.

Figure 4 is a cross sectional view showing a portion of an inner tube and illustrating a modified form with a valve stem operatively positioned thereon. The valve stem shown, illustrating a modified form of the invention.

In the drawing, the numeral 5 is used generally to denote an inner tube for a pneumatic tire which is preferably formed of relatively soft elastic rubber and which is provided with an inflation opening 6.

A valve stem constructed in accordance with this invention is provided with an elongated flat base 7, which is cemented or vulcanized against the outer face of the inner tube 5. The base 7 tapers from a relatively thick central portion to a thin edge portion. In the particular adaptation of the invention shown, the base 7 is provided with a plurality of layers of fabric 8 and 9. The layer 8 extends in parallel, spaced relation to the bottom thereof and the layer 9 has a relatively smaller area and is positioned in said base 7 in parallel, spaced relation to the layer 8.

The numeral 10 denotes a rubber valve stem which is formed integrally with the base 7 and which projects from the central portion thereof. The valve stem 10 tapers from the base thereof to a relatively smaller end portion. The numeral 11 denotes a bore which extends axially through the stem 10 and coincides with the inflation opening 6 in the tube 5. The numeral 12 denotes an anchoring member which is in the form of a cup having a bottom wall 13 provided with an opening 14 which coincides with the bore 11.

The cup 12 is provided with a groove 15 which extends circumferentially therearound and the cup 12 is built into the body of the stem 10, in spaced relation to the outer end thereof. The anchoring member 12 is provided with a cavity 16, the wall of which is internally threaded and a packing washer 17 is positioned in the bottom thereof. The bore 11 is enlarged at the upper end of the stem 10 to receive the valve container 18. The valve container 18 is provided with a reduced, exteriorly threaded, inner portion 19 which is operatively positioned in the cup 12 and bears against the washer 17. The reduced portion 19 provides an annular shoulder 20 which bears against the top of the cup 12 thereby forming an air tight joint between the stem 10 and the valve container 18. The valve container 18 has a cylindrical, intermediate portion 21 and an outer end portion 22. The outer end portion 22 is enlarged thereby forming an annular shoulder 23 which bears against the upper end of the stem 10. The valve container 18 is provided with a cavity which extends coaxially therethrough. The lower end of the said cavity is in the form of a bore 24 which coincides in shape and size to the bore 14 in the bottom wall 13 of the cup 12.

The intermediate portion 21 of the valve container 18 is provided with a cavity 25 which is of larger diameter than the bore 24 thus providing a shoulder 26. The outer portion 22 is provided with a cavity 27 which is larger than the cavity 25 thus providing an annular shoulder 26.

The outer portion 22 is internally and externally threaded and an exteriorly threaded valve mounting plug 29 is operatively positioned therein. A washer 30 is positioned on the shoulder 26 and is held in position by the plug 29 which is threaded downwardly in the cavity 27 and in forced contact therewith. The washer 30 and the plug 29 are provided with alined axial bores 31 which are of smaller diameter than the diameter of the cavity 25. A valve stem 32 extends longitudinally through the bore 31 and is provided on the lower end thereof with a flat head 33 which when the stem is in an upward position closes the bore 31 in the washer 30. The stem 32 is provided on the upper end thereof with flattened portions 34 which engage the wall of the bore 31 and retain the said stem 32 in a proper position in the plug 29.

The numeral 35 denotes a ball which is positioned against the lower face of the valve 33. A coil spring 36 is positioned against the lower portion of the ball 35 and is compressed between the said ball and the shoulder 26, thus yieldably holding the valve 33 in a closed position.

A rubber cap 37 having a cavity 38 is detachably positioned on the end portion 22 of the valve container 19. The portion 22 is exteriorly threaded and the cap 37 is interiorly threaded to more securely hold the cap in position thereon. The lower end of the cap 37 projects downwardly and overlaps the upper end of the stem 10. The cavity 38 projects upwardly from the upper end of the valve container 18, thus providing a space for the upper end of the stem 32.

As shown in Figure 3, the base portion 7 is provided on the attaching face thereof with a layer 7a of plastic rubber and a layer of holland or other protective sheet material 40 which is positioned over the plastic face 7a.

In the adaptation of the invention shown in Figure 4, a valve container 18a which is similar to the container 18 is vulcanized in the end of the stem. In this adaptation of the invention, the anchoring member 12 may be omitted. In this modification of the invention, the reinforcing layers 8 and 9 are omitted from the base 7a and the main body 10a of the stem is provided with a bore 11a which is similar to the bore 11 illustrated in Figure 2.

In applying the invention to the manufacture of new tubes, the flap 7 may be positioned against the outer surface of the tube with the bore 11 in communication with the bore 6 and the stem 10 vulcanized with the tube 5 thereby forming a unitary structure.

In adapting the invention to a repair stem, the flap 7 is provided with a plastic face 7a, the layer of holland 40 is removed and the flap 7 is cemented directly to the outer surface of the tube.

It will thus be seen that I have provided a flexible valve stem, the exterior surface of which is entirely composed of rubber.

I claim:

1. A rubber valve stem comprising an elongated rubber body portion having a longitudinal passage extending therethrough from base to tip, an internally threaded annular fitting vulcanized in said body portion coaxially with said passage and spaced from the base of said body portion so that a flexible portion exists between said fitting and the base of said body portion, said fitting being also spaced from the tip of said body portion, a tubular insert lining the passage between said fitting and the tip of the body portion and having an inner end portion threaded in said fitting, and valve provisions carried by said insert.

2. A rubber valve stem comprising an elongated rubber body portion having a longitudinal passage extending therethrough from base to tip, an internally threaded annular fitting vulcanized in said body portion coaxially with said passage and spaced from the base of said body portion so that a flexible portion exists between said fitting and the base of said body portion, said fitting being also spaced from the tip of said body portion, a tubular insert lining the passage between said fitting and the tip of the body portion and having an inner end portion threaded in said fitting, valve provisions carried by said insert, said insert having a threaded end projecting beyond the tip of said body portion, and a cap engaged with said threaded end and having a skirt embracing the tip of said body portion.

3. A rubber valve stem comprising an elongated rubber body portion of generally tapering form from base to tip and having a longitudinal passage extending therethrough, an internally threaded annular fitting vulcanized in said body portion coaxially with said passage and spaced from the base of said body portion so that a flexible portion exists between said fitting and the base of said body portion, said fitting including an external annular flange at its end toward the base of said rubber body and sufficiently remote from the tip of said tapering body portion so that said flange is circumferentially surrounded by a substantial thickness of the body material so as to be effectively embedded therein, and an insert threaded in said fitting and lining the tip end of said passage, said insert carrying valve provisions.

4. A rubber valve stem comprising an elongated rubber body portion of generally tapering form from base to tip and having a longitudinal passage extending therethrough, an internally threaded annular fitting vulcanized in said body portion coaxially with said passage and spaced from the base of said body portion so that a flexible portion exists between said fitting and the base of said body portion, said fitting including an external annular flange at its end toward the base of said rubber body and sufficiently remote from the tip of said tapering body portion so that said flange is circumferentially surrounded by a substantial thickness of the body material so as to be effectively embedded therein, said fitting also having an internal annular flange defining an opening of substantially the same diameter as that of the passage thereadjacent an insert threaded in said fitting and lining the tip end of said passage, said insert carrying valve provisions, and sealing means between said insert and said internal flange.

5. A rubber valve stem comprising an elongated rubber body portion of generally tapering form from base to tip and having a longitudinal passage extending therethrough, an annular fitting vulcanized in said body portion coaxially with said passage and spaced from the base of said body portion so that a flexible portion exists between said fitting and the base of said body portion, said fitting including an external annular flange at its end toward the base of said rubber body and sufficiently remote from the tip of said tapering body portion so that said flange is circumferentially surrounded by a substantial thickness of the body material so as to be effectively embedded therein, the upper end of said fitting being spaced inwardly from the tip of said body portion, a tubular insert lining the passage between said fitting and the tip of the body portion and having its inner end detachably secured to said fitting, and valve provisions carried by said insert.

6. A rubber valve stem comprising a rubber body of circular cross section having a longitudinal passage extending therethrough from base to tip, said passage having an enlargement at its tip end, a tubular insert in said enlargement and projecting beyond the tip of said body, said insert being enlarged beyond the tip of the body and providing an annular shoulder overlying the extremity of the body tip, the enlarged part of the insert forming a substantially flush continuation of the external surface of the rubber body, an annular fitting molded in said body, and means detachably securing said insert to said fitting.

ARTHUR KEEFE.